(12) United States Patent
Muscatelli et al.

(10) Patent No.: US 8,491,736 B2
(45) Date of Patent: Jul. 23, 2013

(54) METHOD FOR OBTAINING ADN CRYSTALS THROUGH CRYSTALLIZATION IN A VISCOUS MEDIUM

(75) Inventors: Florent Muscatelli, Vert le Petit (FR); Joel Renouard, Saint Martin en Biere (FR); Jean-Marc Bouchez, Ballancourt sur Essonne (FR)

(73) Assignees: Herakles, Paris (FR); Eurenco, Paris (FR)

( * ) Notice: Subject to any disclaimer, the term of this patent is extended or adjusted under 35 U.S.C. 154(b) by 107 days.

(21) Appl. No.: 13/063,614

(22) PCT Filed: Sep. 17, 2009

(86) PCT No.: PCT/FR2009/051744
§ 371 (c)(1),
(2), (4) Date: Mar. 11, 2011

(87) PCT Pub. No.: WO2010/031962
PCT Pub. Date: Mar. 25, 2010

(65) Prior Publication Data
US 2011/0171104 A1     Jul. 14, 2011

(30) Foreign Application Priority Data
Sep. 18, 2008 (FR) ...................... 08 56269

(51) Int. Cl.
| | | |
|---|---|---|
| D03D 23/00 | (2006.01) | |
| D03D 43/00 | (2006.01) | |
| C01B 21/00 | (2006.01) | |
| C01C 1/04 | (2006.01) | |
| C01C 3/08 | (2006.01) | |

(52) U.S. Cl.
USPC ......... 149/109.6; 423/351; 423/362; 423/371

(58) Field of Classification Search
USPC ...................... 423/371, 51, 362; 149/109.6
See application file for complete search history.

(56) References Cited

U.S. PATENT DOCUMENTS

| | | | | |
|---|---|---|---|---|
| 3,222,231 | A | * 12/1965 | Markels, Jr. et al. | ........ 23/295 R |
| 4,544,769 | A | * 10/1985 | Engel et al. | .................... 564/242 |
| 5,714,714 | A | * 2/1998 | Stern et al. | ................. 149/109.6 |
| 5,976,483 | A | * 11/1999 | Langlet et al. | ................ 423/385 |
| 7,789,980 | B2 | 9/2010 | Benazet et al. | |
| 7,798,980 | B2 * | 9/2010 | Melsheimer | .................. 600/585 |
| 2006/0272755 | A1 * | 12/2006 | Borne | ............................. 149/21 |

FOREIGN PATENT DOCUMENTS

| | | |
|---|---|---|
| DE | 3527200 A1 | 3/1987 |
| DE | 3920999 C1 | 9/1990 |
| EP | 1256558 A2 | 11/2002 |
| FR | 2884244 | 4/2005 |
| FR | 2886641 | 6/2005 |
| WO | WO 97/47571 | 12/1997 |
| WO | WO 99/01408 | 1/1999 |
| WO | WO 99/21794 | 5/1999 |
| WO | WO 2006/108991 A2 | 10/2006 |

OTHER PUBLICATIONS

Treivus, E.B., "On the choice of solvent for crystallization," Journal of Crystal Growth, vol. 143, pp. 369-370, 1994.
Storm et al., "Some effects of solvent properties on nucleation," Journal of Crystal Growth, vol. 7, No. 1, pp. 55-60, 1970.
Wang et al., "Theory Pract. Energ. Mater.," Proc. Int. Autumn Semin. Propellants, Explos. Pyrotech., pp. 85-91, 1996.
Treivus, E.B., "On the choice of solvent for crystallization," Journal of Crystal Growth, vol. 143, pp. 369-370, 1994.
Storm, et al., "Some Effects of Solvent Properties on Nucleation," Journal of Crystal Growth, vol. 7, pp. 55-60, 1970.
Wang Guogiang et al., "Synthesis of Novel Oxidizer Dinitroamide Salts," Theory and Practice of Energetic Materials, pp. 85-91, 1996.

* cited by examiner

Primary Examiner — James McDonough
(74) Attorney, Agent, or Firm — Hamre, Schumann, Mueller & Larson, P.C.

(57) ABSTRACT

The present invention relates to a method for crystallizing ammonium dinitramide (ADN), through spontaneous nucleation and crystal growth, from a solution containing said ammonium dinitramide (AND) dissolved in a solvent. Said solvent characteristically has a viscosity greater than or equal to 0.25 Pa s (250 cP) when said spontaneous nucleation is implemented. The ADN crystals obtained by said method have a median shape factor of 1 to 1.5 and are perfectly suitable for placement in the composition of energy materials.

13 Claims, 3 Drawing Sheets

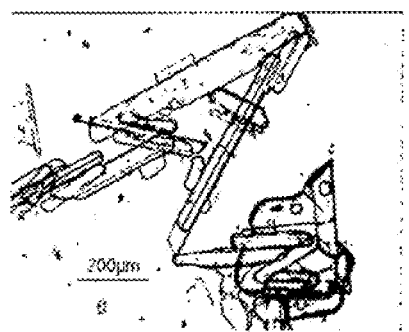
FIG.1A
PRIOR ART
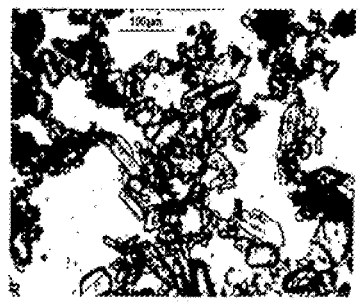
FIG.1B
PRIOR ART
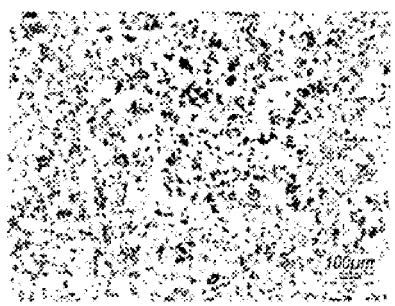 
FIG.2A   FIG.2B

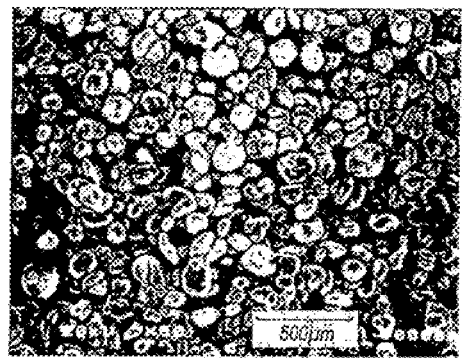
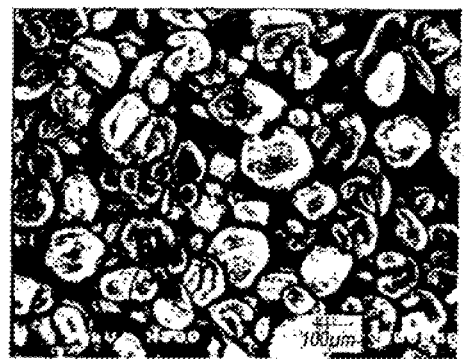
FIG.5A　　　　FIG.5B
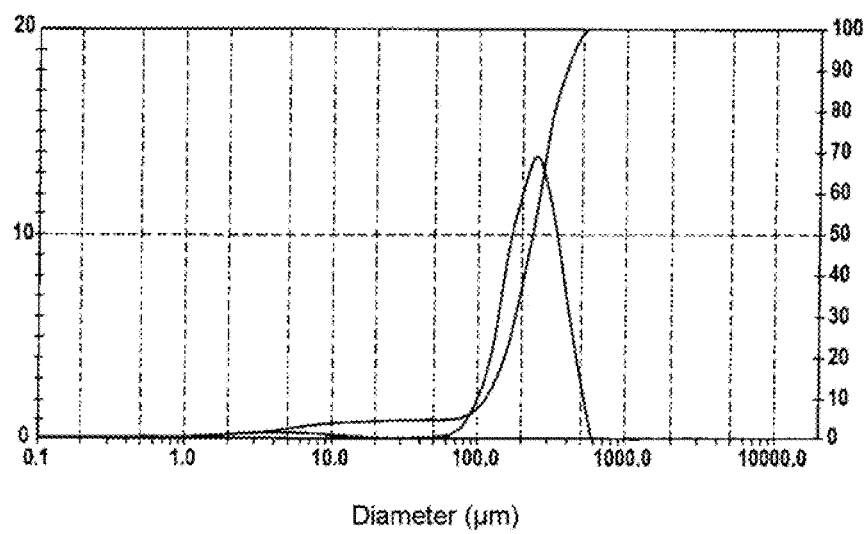
FIG.6

METHOD FOR OBTAINING ADN CRYSTALS THROUGH CRYSTALLIZATION IN A VISCOUS MEDIUM

The subject of the present invention is a method for obtaining ammonium dinitramide crystals.

The crystals obtained by said method have a crystalline shape with a low median shape factor in a particle size suitable for the formation of energetic materials. This is explained in detail hereinafter.

Ammonium dinitramide corresponds to the formula: $NH_4N(NO_2)_2$. It is known under the name: "ADN" (Ammonium DiNitramide).

It is most particularly known as an oxidizing charge, devoid of chlorine, capable of replacing ammonium perchlorate in propellant compositions.

Various pathways for the synthesis of said ADN have been proposed (they have been summarized by Wang Guogiang, Chen Hong and Ma Yuanying, in Theory Pract. Energ. Mater., [Proc. Int. Autumn Semin. Propellants, Explos. Pyrotech.] (1996) 85-91 (Chemical Abstract: 126: 106102)).

Two of them are mainly inplemented:
- the "urethane" pathway: the nitration and treatment of urethane result in the ammonium salt of N-nitrourethane (ANU). This salt is then continuously nitrated with $N_2O_5$ so as to form the N,N-dinitrated derivative which is not isolated but is reacted directly with ammonia so as to form ADN and regenerate the urethane (pathway illustrated in U.S. Pat. No. 5,714,714);
- the "sulfamate" pathway: ammonium sulfamate or potassium sulfamate is nitrated with a sulfonitric mixture at low temperature and then the reaction medium is neutralized and generally concentrated (pathway illustrated in U.S. Pat. No. 5,976,483).

After either one of these synthesis pathways, the ADN, obtained in solution, Is crystallized in a conventional manner (by concentration, by the addition of a non-solvent and/or by cooling etc.). The resulting crystals of crude ADN are in the form of small rods, or even of needles. Such small rods or needles are shown in the appended FIG. 1A (photograph taken using a transmission optical microscope). They have a shape factor of approximately 10.

Such crystal morphology makes ADN unsuitable for formulation, since the feasibility of the compositions is greatly compromised due to the large increase in viscosity as soon as high loading rates are envisioned.

With reference to the abovementioned technical problem several methods have been described for obtaining the ADN component in a quasi-spherical geometry in a particle size suitable for the formulation of energetic materials. It has in particular been recommended to convert its crystals to spherical granules. Those skilled in the art use the term "prills". Said "prills" (said spherical granules) are obtained either by melting the ADN in a non-solvent liquid, with vigorous agitation, and then cooling rapidly, or by using a "prilling" tower in which the molten ADN is sprayed into a stream of gas.

The first of these techniques, termed "prilling in suspension", is in particular described in application WO-A-99/21794, the second in applications WO-A-97/47571 and WO-A-99/01408.

Neither of these techniques is completely satisfactory:
"prilling in suspension", also termed melt crystallization, with a targeted particle size objective, is difficult to carry out above a few kilograms per batch;
"prilling" in a tower involves the handling of molten ADN, even though this compound is known to be unstable above its melting point. Phenomena of local superheating or accumulation of material are liable to cause accidents.

Another method has been described in application FR 2 884 244. It allows the generation of crystals with an original crystalline shape that is more suitable for their formulation, through the use of (crystallization) additives which are modifiers of the crystal habit of ADN. This method, although original and effective, has proved to be difficult to extrapolate to the industrial scale. Crystals obtained by this method are shown in the appended FIG. 1B (photograph taken using a transmission optical microscope). They have a shape factor of less than or equal to 5.

In such a context, with reference to the technical problem of the formulation of ADN crystals, the applicant proposes an entirely original and inventive solution, which distinguishes itself from the prejudice of those skilled in the art referring to the impossibility of obtaining, by simple crystallization, (quasi) spherical crystals of ADN with a particle size suitable for formulating energetic materials. This solution is not based on conditioning the crude crystals, nor on crystallization in the presence of an added chemical element which is a crystal habit modifier, but on controlling the parameters of crystal growth, resulting in (quasi) spherical (spherical or quasi-spherical) crystals with a selected particle size range, that can be from a few microns to several hundred microns.

Modifying the parameters of crystal growth in order to generate crystals in an original crystalline shape is not an innovative operation in itself. The parameters in question, such as the nature of the solvent, in particular its viscosity for controlling the relative speeds of transfer and integration of the atoms into the crystal, the temperature cycles for shifting the equilibrium of the solution on the solubility diagram, the presence of impurities, the agitation, etc., are known to those skilled in the art. The modification of said parameters has, however, never been described, even less controlled, to the applicant's knowledge, in the context of ADN, with reference to the technical problem of its formulation.

In this particular context, the inventors have shown, entirely surprisingly, that it is possible to intervene in the ADN crystallization process with a view to reducing the shape factor of the crystals and to control the particle size thereof.

According to its subject, the present invention therefore relates to a method for crystallizing ammonium dinitramide (ADN) through spontaneous nucleation and crystal growth, from a solution containing said ADN in solution in a solvent. Said method is characterized in that said solvent has a viscosity greater than or equal to 0.25 Pa·s (250 cP) when said spontaneous nucleation is implemented.

In a manner that is in no way limiting, it may be specified here that said spontaneous nucleation of the crystallizing method of the invention generally takes place in a solvent which has a viscosity between 0.25 Pa·s (250 cP) and 1 Pa·s (1000 cP). Advantageously, said viscosity of the solvent is between 0.3 Pa·s (300 cP) and 0.65 Pa·s (650 cP); very advantageously, it is between 0.45 Pa·s (450 cP) and 0.55 Pa·s (550 cP).

The viscosity values indicated above (in Pa·s and cP (centiPoises)) are values measured with a Brookfield viscometer.

The crystallizing method of the invention does not therefore require seeding. It is implemented starting, simply, from the solution containing the ADN in solution in a solvent. The nucleation in question is spontaneous.

Characteristically, in the context of the implementation of the method of the invention, the ADN crystals appear in a viscous medium (see above). Said ADN crystals appear, grow (in one or more steps (see below)) and are recovered (small or larger (see below)) in such a medium.

Characteristically, owing to the viscosity of the solvent during the crystallization, the crystal growth takes place under predominantly diffusive conditions (i.e. the transfer of the material for crystal growth is the phenomenon that limits said crystal growth, it being possible for said transfer of material to be expressed by the Sherwood number), this being the case from the beginning of said crystal growth subsequent to spontaneous nucleation. The inventors have shown that this control of crystal growth under diffusive conditions results in (quasi) spherical crystals with a particle size that is advantageous (and also, to a certain extent, controllable: see below). For such control, the solvent viscosity parameter is therefore managed, according to the invention, as soon as there is spontaneous nucleation.

The method for obtaining ADN crystals of the invention comprises an "original" crystallization (such a crystallization takes place under predominantly diffusive conditions, in a viscous medium, and from the beginning of spontaneous nucleation), in a method of crystallization that is conventional per se. Specifically, said nucleation and the growth of the crystals which follows result from conventional methods: increase in the concentration of ADN in the solution (following evaporation of the solvent, for example) and/or addition of a non-solvent for the ADN to said solution and/or cooling of said solution. One of these methods is advantageously implemented, but it is not out of the question to implement at least two thereof, successively or jointly.

Crystallization by cooling is the preferred crystallization method. Thus, in the context of the method of the invention, the nucleation step is advantageously carried out following a step of cooling the solution (which contains the ADN in solution in the solvent).

Those skilled in the art have a perfect control of the implementation of such crystallization methods by cooling. The equilibrium of the solution is shifted according to, successively, the solubility zone, the metastable zone and the spontaneous nucleation zone of the solution.

The solvent in question in the method of the invention is quite obviously a solvent for ADN. It is a priori chosen from known ADN crystallization solvents. It should have the required viscosity at the temperature for nucleation of the ADN in solution in said solvent.

Said solvent is generally chosen from polar protic solvents, and mixtures thereof (targeting the desired viscosity range in the context of the invention). Said solvent is advantageously an alcohol, for example glycerol, 1,4-butanediol or a mixture of alcohols, in particular a mixture of glycerol and 1,4-butanediol. In the context of the invention, the use of a mixture containing 50% by volume of glycerol and 50% by volume of 1,4-butanediol is most particularly recommended.

According to the preferred variant of implementation of the method of the invention, the crude ADN is solubilized under hot conditions (typically 60° C.) in such a solvent, and then the temperature of the solution is lowered; the viscosity of the solvent increasing with the cooling. The solution is agitated so as to allow homogenization thereof and to avoid settling out of the crystals. The agitation of the solution can also make it possible, by rheological fluidization, to cool the solvent to below its solidification point in order to reach the viscosity range required for said solvent by the method of the invention. The crystallization of the ADN in solution should begin only when the viscosity of the solvent has reached the range required by the method.

The inventors have, moreover, identified an additional parameter for regulation of the nucleation temperature of the ADN in solution, making it possible to broaden the metastable zone of the solution, and therefore to give greater latitude in the choice of the solvent with suitable viscosity (viscosity generally between 250 and 1000 cP during ADN crystallization). Thus, the presence of nitrate ions ($NO_3^-$) (generally between 0.1% and 0.5% by mass, i.e. at low level), lowers the ADN nucleation temperature, i.e. increases the width of the metastable zone of the solution (comparison for a given cooling rate). The temperature for nucleation of the ADN in solution can therefore thus be adjusted (typically between 20° C. and 0° C.) through the presence of nitrate ions in such a way as to correspond to a temperature sufficiently low for the solvent to have the required viscosity for implementing the method. The nitrate ions may be contained as impurities in the crude ADN material introduced into the solution, and/or be added separately to said solution, advantageously by addition of ammonium nitrate to the solution.

When the method of the invention, according to a first variant, comprises principally a continuous cooling of the solution and a crystal growth phase (cooling which makes it possible to achieve spontaneous nucleation and which is advantageously followed by the nucleation temperature being maintained, despite heat being given off, so as to advantageously maintain the viscosity during the generation of the crystals), the crystals obtained have a median shape factor of between 1 and less than 1.5. Their median diameter is typically less than 100 μm. They are small faceted crystals, the different faces of which have developed at the same speed, which gives them a (quasi) spherical geometry.

The inventors have also demonstrated that, when the crystallization method in question is also based on cooling of the solution, the application of a thermal cycle imposed on the solution makes it possible to obtain crystals of larger particle size, particularly suitable for the formulation of energetic materials. Said crystals also have a median shape factor of between 1 and less than 1.5. Their median diameter is greater than or equal to 100 μm, typically between 100 μm and 400 μm. They are larger (quasi) spherical crystals.

The "shape factor" parameter, used with reference to the crystals obtained by the method of the invention, is defined as the ratio, for a crystal, of its maximum Féret diameter to its minimum Féret diameter; said maximum Féret diameter corresponding to the maximum distance between two parallel tangents on opposite sides of the crystal, and said minimum Féret diameter corresponding to the minimum distance between two parallel tangents on opposite sides of the crystal.

The abovementioned heat cycle imposed is carried out in four steps:
  a first step of imposed cooling of said solution, which makes it possible to pass through the metastable zone to the thermodynamic zone of spontaneous nucleation;
  a second step of spontaneous nucleation and crystalline growth for the generation of small crystals at constant imposed temperature until a return to the equilibrium of the solution on the solubility curve;
(these first two steps corresponding to the method of the invention according to the first variant above)
  a third step comprising imposed heating of the solution loaded with small crystals while remaining in the metastable zone for partial dissolution of said small crystals, followed by a hold at a temperature for thermodynamic equilibrium of the solution; then
  a fourth step of continuous imposed cooling while remaining in the metastable zone of the solution for the generation of larger crystals.

Thus, the method of the invention can therefore advantageously comprise:

said first step of cooling;
said second step of spontaneous nucleation and generation of small crystals;
recovery of said small crystals (first variant of said method) or said third step of partial dissolution by heating of said small crystals, then of a hold at a thermodynamic equilibrium temperature; third step followed by
said fourth step of cooling for the generation of larger crystals; and
recovery of said larger crystals (second variant of the method of the invention).

The recovery of the crystals is generally carried out by filtration.

It is understood that, in general, the specificity of said method is expressed in the first part of the second step and advantageously in the first part of the second step and at the end of the first step (cooling).

Moreover, in general and more particularly in a context of implementation of the method of the invention with application of the thermal cycle specified above (second variant resulting in large crystals), the agitation conditions are opportunely appropriate in order to avoid rapid settling out of the larger crystals during their growth phase, while at the same time limiting the shear at the blade tip. Such a shear is obviously harmful since it causes cracks in the crystals. It is, however, noted that a certain amount of abrasion of said crystals advantageously contributes to obtaining (quasi) spherical crystals. The regulation of the agitation conditions depends on the exact properties of the solution, and the geometric parameters of the equipment (shape and volume of the tank containing the solution, geometry of the agitator), and is carried out case by case. This regulation and the optimization thereof are within the scope of those skilled in the art. It may be indicated that the crystallizing method of the invention is advantageously carried out in a laminar agitated (viscous) medium.

The ADN crystals obtained by means of the method described above (method of crystallization in solution with nucleation and crystal growth in a high-viscosity solvent) have an advantageous crystalline shape. Said crystals are characterized by a median shape factor of between 1 and less than 1.5.

Said ADN crystals which have such a shape factor can in particular have a median diameter of less than 100 μm (small faceted crystals that can be obtained according to the first method variant specified above) or a median diameter greater than or equal to 100 μm, typically between 100 and 400 μm ((quasi) spherical crystals which can be obtained according to the second method variant specified above). Said crystals which have a median diameter between 100 and 400 μm are particularly preferred.

On reading the foregoing, those skilled in the art have already understood the great advantage of these ADN crystals for use in the production of energetic materials, in particular of propellant or explosive type.

Energetic materials, containing energetic charges in an energetic or non-energetic binder, of which at least a part (or even all) of said energetic charges consists of crystals as described above (as obtained by the method described above), thus constitute an advantageous outlet for said crystals.

Said energetic materials can contain a high content of said crystals. Thus, they advantageously contain more than 30%, very advantageously more than 50%, by weight of said crystals. They are a priori capable of containing up to 70% by weight of said crystals.

The crystallization proposed according to the invention makes it possible to obtain ADN crystals that are particularly advantageous in that they make it possible to use said ADN in energetic materials with a high charge level.

It is now proposed to illustrate the invention, in terms of its method and product aspects, on the appended figures and through the examples hereinafter.

FIG. 1A, as already specified, shows ADN crystals from the prior art, of the "small rod" or "needle" type, observed under a transmission optical microscope.

FIG. 1B, as already specified, shows ADN crystals from the prior art obtained with crystal habit modifier additives (as described in application FR 2 884 244), observed under a transmission optical microscope.

FIGS. 2A and 2B show ADN crystals, obtained after the implementation of example 1 hereinafter, observed under a transmission optical microscope: crystals of FIG. 2A obtained according to the invention (with addition of nitrate ions), crystals of FIG. 2B obtained without addition of nitrate ions (outside the conditions of the invention).

Figure 3:
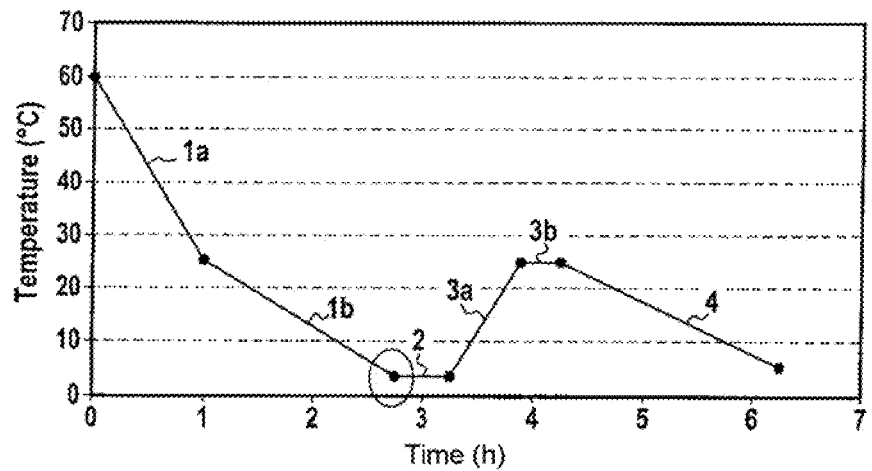
FIGS. 3 and 4 show the appearance of the cooling thermal cycle for obtaining ADN crystals having an average particle size greater than or equal to 100 μm.

FIGS. 5A and 5B show, at different scales, ADN crystals, having a particle size between 100 μm and 400 μm, obtained after the implementation of example 2 hereinafter, and observed with a scanning electron microscope.

FIG. 6 shows the particle size curve for the ADN crystals observed in FIGS. 5A and 5B, obtained after the implementation of example 2.

EXAMPLE 1

This first example relates to the production of small crystals, having a median diameter in the region of 35 μm, on the scale of a 2 l reaction vessel.

In the reaction vessel having a volume of 2 l, 400 g of crude ADN and 1.28 g of nitrates (+0.32% of nitrate) provided by ammonium nitrate are dissolved in a mixture of 250 ml of 1,4-butanediol and 250 ml of glycerol, initially at a temperature of 60° C.

The agitation is carried out by means of an Ekato® Viscoprop four-bladed shaft. The rotational speed of the shaft that is selected is 350 rpm. The agitation Reynolds number is 186, the power dissipation per unit volume (P/V) is 0.4 W/l and the peripheral velocity of the shaft (Vp) is 1.46 m·s$^{-1}$. The relative pumping flow rate (Qp/V) is 200% under these conditions.

These various values show that the agitation conditions are theoretically effective for suspending crystals without shear. In addition, the choice of the shaft (Ekato® Viscoprop or Optifoil 3P or 4P impeller) is not trivial since its particular shape makes it possible to very effectively agitate viscous media with a moderate shear. The tank bottom fluid speeds are high and therefore allow optimum suspension of the crystals. The same is true for the axial speeds at which the fluid rises at the wall, which allows optimum heat exchange.

The solution in the reaction vessel then undergoes continuous imposed cooling in two steps: the first step is quite a rapid imposed cooling ramp from a temperature of 60° C. to 25° C. in 1 h, the second step is a less pronounced, imposed temperature ramp making it possible to reach the nucleation temperature, from 25° C. to 3° C. in 1 h30. A third step is constituted of an imposed temperature hold at 3° C., making it possible to absorb the heat released by the nucleation in order to maintain the low temperature, and thus the required viscosity of the solvent, during the crystal growth.

The ADN crystal growth is initiated, under predominantly diffusive conditions, at the nucleation temperature of 5° C.

The measured viscosity of the solvent at the ADN nucleation temperature is 0.5 Pa·s (500 cP).

When the crystal growth is finished, the product is filtered using a single-plate filter, under a gas pressure (compressed air or nitrogen).

FIG. 2A shows a photograph with an optical microscope of the ADN crystals obtained in the context of this example. The median diameter of said crystals is approximately 30 to 40 μm. The macroscopic appearance of the crystals is rounded, far-removed from that of the crude ADN.

It should be underlined in the context of this example that the presence of the nitrate ions in the solution is essential, said nitrate ions lowering the ADN nucleation temperature. Under the same operating conditions as those of the present example but without nitrate ions added to the solution, the ADN nucleation temperature is higher, around 20° C., a temperature for which the solvent retained is not viscous enough (~0.18 Pa·s (180 cP)), which does not make it possible to obtain conditions governed by diffusion and therefore crystals with a spherical appearance. FIG. 2B thus shows nonspherical crystals obtained according to the procedure of the present example but without the addition of nitrate ions.

EXAMPLE 2

The present example illustrates the implementation of the method of the invention on a medium scale, proving the industrial potentials of said method for obtaining quasi-spherical ADN crystals having a median diameter of between 100 μm and 400 μm.

In a reaction vessel with a volume of 5 l, 700 g of crude ADN, and 2.45 g of nitrate ions (+0.35% of nitrate) provided by ammonium nitrate, initially at 60° C., are dissolved in a 50/50 mixture by volume of 1,4-butanediol and glycerol.

The implementation of the method resulting in crystals of large particle size requires appropriate agitation conditions in order to avoid rapid settling out of the larger crystals during their growth phase. The regulation of the agitation conditions depends on the exact properties of the solution, and the geometric parameters of the equipment (shape and volume of the tank containing the solution, geometry of the agitator); it is carried out case by case and is within the scope of those skilled in the art. The use of an in situ particle size measuring probe (such as the in situ Lasentec© probe from the company Mettler Toledo) in the reaction vessel is a precious tool for making sure that the agitation conditions are correctly regulated. This type of in situ measurement makes it possible, in addition, to check that the crystallizing method is progressing correctly.

For the particular case of the example described, the reaction vessel is also equipped with an Ekato® Viscoprop four-bladed shaft, and has four baffles.

By using an agitation speed of 500 rpm, a good compromise is in theory found between power dissipation per unit volume (>0.5 W/L) and moderate shear generated by the shaft (Vp~2 m·s$^{-1}$).

Figure 4:
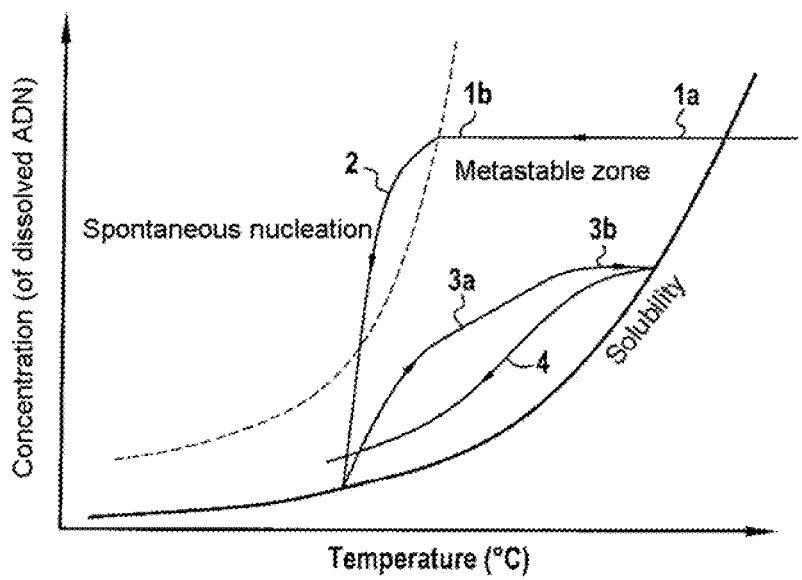

In order to obtain crystals of larger dimensions that are perfectly suitable for energetic materials, a cooling thermal cycle is applied to the solution, which is complex but perfectly controllable. It comprises four steps which each have a precise purpose with regard to controlling the crystallization. The imposed temperatures for conditioning the reactor during these four steps are shown in FIG. 3. FIG. 4 shows, during these four steps, the states reached by the solution in a solubility diagram.

The four steps under consideration are described below.
Step 1:
The first step 1 consists of imposed cooling carried out in two substeps 1a and 1b.

The first substep (1a) corresponds to a relatively rapid linear cooling ramp (35° C./h) which makes it possible to make a saving in terms of overall time of the operation. Indeed, if the supersaturation changes during this first cooling 1a, one is still in the metastable zone.

The second cooling substep (1b) is linear but with a less pronounced cooling ramp (12.5° C./h), until the spontaneous nucleation temperature is reached. The spontaneous nucleation temperature is either known in the context of a well-polished method, or determined by means of in situ measurements.

In the context of the present example, the spontaneous nucleation begins at a temperature of 5-6° C. Said nucleation is relatively exothermic and abrupt and it is therefore better regulated if the cooling slope is moderate. The measured viscosity of the solvent at this ADN spontaneous nucleation temperature is 0.5 Pa·s (500 cP).

Step 2:
Step 2 corresponds to a temperature hold which allows the solution to return to thermodynamic equilibrium. The imposed temperature is constant, while the real temperature is somewhat above said imposed temperature owing to the exothermic nature of the nucleation reaction.

The crystal growth takes place under predominantly diffusive conditions owing to the viscosity of the medium, but the nucleation nevertheless takes place relatively intensely and results in crystals formed which are very small (<10 μm).

Step 3:
Step 3 is composed of two substeps 3a and 3b.
Step 3a allows, via imposed heating of the solution, partial dissolution of the crystals present in the solution. Step 3b corresponds to a temperature hold, which allows the solution to return to thermodynamic equilibrium.

Step 4:
Step 4 consists of moderate linear imposed cooling (10° C./h) in order to bring about growth of the crystals in a controlled manner, while at the same time maintaining the equilibrium of the solution in the metastable zone, as close as possible to the solubility curve.

Monitoring by in situ particle size measurement confirms that the final cooling slope (10° C./h) is actually helpful to crystal growth, that the shear of the agitation shaft is controlled and that the suspension remains homogeneous.

After filtration and washing, the recovery yield is about 50%. The macroscopic appearance of the recovered crystals is different than that of the crude ADN. The recovered ADN is not colored, has a less flocculent appearance and aggregates less readily.

The recovered crystals have a spherical morphology, as shown by the photographs obtained by scanning electron microscopy in FIGS. 5A and 5B. The median shape factor of said crystals is between 1 and 1.5.

With reference to FIG. 6, the (volume) median diameter $D_{V50}$ of said recovered crystals is 226 μm and the dispersion of the product obtained is moderate, between $D_{V10}$=115 μm and $D_{V90}$=380 μm.

The invention claimed is:
1. A method for crystallizing ammonium dinitramide, comprising: implementing spontaneous nucleation and generating a crystal in a solution containing ammonium dinitramide and a solvent, wherein said solvent has a viscosity greater than or equal to 0.25 Pa.s (250 cP) when said spontaneous nucleation is implemented.

2. The method as claimed in claim 1, wherein said solvent has a viscosity between 0.25 Pa.s (250 cP) and 1 Pa.s (1000 cP) when said spontaneous nucleation is implemented.

3. The method as claimed in claim 1, wherein said solution is cooled before said spontaneous nucleation is implemented.

4. The method as claimed in claim 1, wherein said solvent is a polar protic solvent.

5. The method as claimed in claim 1, wherein said solvent is a mixture of glycerol and 1,4-butanediol.

6. The method as claimed in claim 1, wherein said solution containing said ammonium dinitramide contains nitrate ions.

7. The method as claimed in claim 6, wherein the nitrate ion concentration of said solution is between 0.1% and 0.5% by weight.

8. The method as claimed in claim 6, wherein said nitrate ions are obtained by said ammonium nitrate being introduced into said solvent.

9. The method as claimed in claim 3, wherein the method comprises the following successive steps:
- a first step of imposed cooling of said solution as far as into the thermodynamic zone of spontaneous nucleation of said solution;
- a second step of spontaneous nucleation and crystal growth for the generation of small crystals at constant imposed temperature until a return to equilibrium of the solution on the solubility curve; and
- recovery of said small crystals.

10. The method as claimed in claim 3, wherein the method comprises the following successive steps:
- a first step of imposed cooling of said solution as far as into the thermodynamic zone of spontaneous nucleation of said solution;
- a second step of spontaneous nucleation and crystal growth for the generation of small crystals at constant imposed temperature until a return to equilibrium of the solution on the solubility curve; and
- a third step comprising imposed heating of the solution loaded with small crystals while remaining in the metastable zone for partial dissolution of said small crystals, followed by a hold at a temperature for thermodynamic equilibrium of the solution; said third step being followed by
- a fourth step of continuous imposed cooling while remaining in the metastable zone of the solution for the generation of larger crystals; and by
- recovery of said larger crystals.

11. The method as claimed in claim 1, wherein said solvent has a viscosity between 0.3 Pa.s (300 cP) and 0.65 Pa.s (650 cP) when said spontaneous nucleation is implemented.

12. The method as claimed in claim 1, wherein said solvent has a viscosity between 0.45 Pa.s (450 cP) and 0.55 Pa.s (550 cP) when said spontaneous nucleation is implemented.

13. The method as claimed in claim 1, wherein said crystal has a median shape factor of between 1 and 1.5.

* * * * *